United States Patent
Wu et al.

(10) Patent No.: US 12,181,748 B2
(45) Date of Patent: Dec. 31, 2024

(54) DISPLAY APPARATUSES

(71) Applicant: WUHAN CHINA STAR OPTOELECTRONICS TECHNOLOGY CO., LTD., Hubei (CN)

(72) Inventors: Teng Wu, Hubei (CN); Jiawen Jiang, Hubei (CN); Qiang He, Hubei (CN); Yang Yu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/459,010

(22) Filed: Aug. 30, 2023

(65) Prior Publication Data

US 2024/0402537 A1 Dec. 5, 2024

Related U.S. Application Data

(63) Continuation of application No. PCT/CN2023/102299, filed on Jun. 26, 2023.

(30) Foreign Application Priority Data

May 31, 2023 (CN) .......................... 202310650023.6

(51) Int. Cl.
*G02F 1/1333* (2006.01)
*G02F 1/1335* (2006.01)
*G02F 1/13357* (2006.01)

(52) U.S. Cl.
CPC .. *G02F 1/133611* (2013.01); *G02F 1/133512* (2013.01); *G02F 1/133514* (2013.01)

(58) Field of Classification Search
None
See application file for complete search history.

(56) References Cited

U.S. PATENT DOCUMENTS

2015/0160498 A1* 6/2015 Zhang ............... G02F 1/134309
428/136
2019/0164521 A1* 5/2019 Feng ..................... G09G 3/3208
(Continued)

FOREIGN PATENT DOCUMENTS

CN 105403950 A 3/2016
CN 107731159 A 2/2018
(Continued)

OTHER PUBLICATIONS

International Search Report in International Application No. PCT/CN2023/102299, mailed on Mar. 1, 2024, with English translation.
(Continued)

*Primary Examiner* — Sang V Nguyen
(74) *Attorney, Agent, or Firm* — HSML P. C.

(57) ABSTRACT

A display apparatus includes a display panel having a first display region, a second display region and an opening region. When the display apparatus is in a black state, the first display region has a first luminance value $I_1$, the second display region and the opening region have a first luminance difference value $DI_1$, the first display region and the second display region have a second luminance difference value $DI_2$, and each of a ratio of $DI_1$ to $I_1$ and a ratio of $DI_2$ to $I_1$ ranges from 0.001 to 0.1.

20 Claims, 3 Drawing Sheets

(56) References Cited

U.S. PATENT DOCUMENTS

| | | | | |
|---|---|---|---|---|
| 2020/0110298 A1* | 4/2020 | Li | .................. | G02F 1/13338 |
| 2020/0110495 A1* | 4/2020 | Han | .................. | H10K 59/131 |
| 2020/0380917 A1* | 12/2020 | Zhu | .................. | H10K 59/1213 |
| 2020/0402440 A1* | 12/2020 | Takasugi | .............. | G09G 3/3208 |
| 2021/0065625 A1 | 3/2021 | Wang et al. | | |
| 2021/0351236 A1 | 11/2021 | Shin et al. | | |
| 2022/0406256 A1* | 12/2022 | An | .................. | G09G 3/3233 |

FOREIGN PATENT DOCUMENTS

| | | | |
|---|---|---|---|
| CN | 109581749 | A | 4/2019 |
| CN | 110729332 | A | 1/2020 |
| CN | 110767099 | A | 2/2020 |
| CN | 112310322 | A | 2/2021 |
| CN | 113113550 | A | 7/2021 |
| CN | 113764602 | A | 12/2021 |
| CN | 113997868 | A | 2/2022 |
| CN | 114283699 | A | 4/2022 |

OTHER PUBLICATIONS

Written Opinion of the International Search Authority in International Application No. PCT/CN2023/102299, mailed on Mar. 1, 2024, with English translation.

German Office Action issued in corresponding German Patent Application No. 11 2023 000 029.8 dated Jan. 25, 2024, pp. 1-8, with English translation.

* cited by examiner

DISPLAY APPARATUSES

CROSS-REFERENCE TO RELATED APPLICATIONS

This application is a continuation of International Application No. PCT/CN2023/102299, filed on Jun. 26, 2023, which claims priority to Chinese Patent Application No. 202310650023.6 filed on May 31, 2023. The disclosures of the above applications are incorporated herein by reference in their entireties.

TECHNICAL FIELD

The present application relates to display technologies, and specifically, to display apparatuses.

BACKGROUND

In a vehicle electronic system, a driver monitoring system (DMS) can be used for driver identification, driver fatigue monitoring, dangerous driving behavior monitoring and the like. A camera assembly is an important accessory of the DMS and used to monitor driver status.

With a Camera Under Panel (CUP) technology, the camera assembly can be hidden under a display panel without affecting a display effect of the display panel. When the camera assembly is hidden under the display panel, there is no backlight under the CUP region. Thus, when an instrument panel displays in a black state, the CUP region will have a luminance value less than that of a region surrounding the CUP region, so that the display apparatus has a poor overall black effect in the black state.

SUMMARY

In view of the above, one or more embodiments of the present application provide a display apparatus, including: a display panel, the display panel having a first display region, a second display region, and an opening region, where the first display region is adjacent to the second display region, and the second display region is adjacent to the opening region: when the display apparatus is in a black state, the first display region, the second display region and the opening region respectively have a first luminance value $I_1$, a second luminance value and a third luminance value that decrease sequentially, a ratio of $DI_1$ to $I_1$ ranges from 0.001 to 0.1, and a ratio of $DI_2$ to $I_1$ ranges from 0.001 to 0.1, where $DI_1$ represents a first luminance difference between the second luminance value and the third luminance value, and $DI_2$ represents a second luminance difference between the first luminance value and the second luminance value.

In addition, one or more embodiments of the present application provide a display apparatus, including a display panel, a backlight module and a sensor, where the display panel having a first display region, a second display region, and an opening region, the first display region is adjacent to the second display region, and the second display region is adjacent to the opening region: the backlight module disposed on a backlight side of the display panel to correspond to the first display region and the second display region: the sensor corresponds to the opening region: where when the display apparatus is in a black state, the first display region, the second display region and the opening region respectively have a first luminance value $I_1$, a second luminance value and a third luminance value that decrease sequentially, a ratio of $DI_1$ to $I_1$ ranges from 0.001 to 0.1, and a ratio of $DI_2$ to $I_1$ ranges from 0.001 to 0.1, where $DI_1$ represents a first luminance difference between the second luminance value and the third luminance value, and $DI_2$ represents a second luminance difference between the first luminance value and the second luminance value.

DETAILED DESCRIPTION

Some embodiments of the present application will be described in detail below with reference to the accompanying drawings. The embodiments are described for illustrative purposes only and are not intended to limit the present application.

One or more embodiments of the present application provide a display apparatus. Details are described below. It should be noted that a description order of the following embodiments is not limited to a preferred order of the embodiments.

One or more embodiments of the present application provide a display apparatus, including a display panel, where the display panel includes a first display region, a second display region, and an opening region. The first display region is adjacent to the second display region, when the display apparatus is in a black state, the first display region, the second display region and the opening region respectively have a first luminance value $I_1$, a second luminance value and a third luminance value that decrease sequentially, a ratio of $DI_1$ to $I_1$ ranges from 0.001 to 0.1, and a ratio of $DI_2$ to $I_1$ ranges from 0.001 to 0.1, where $DI_1$ represents a first luminance difference between the second luminance value and the third luminance value, and $DI_2$ represents a second luminance difference between the first luminance value and the second luminance value. In the black state, luminance value of the first display region, luminance value of the second display region, and luminance value of the opening region in one or more embodiments of the present application successively decreases, and a value range of $K_1$ and a value range of $K_2$ are set between 0.001 and 0.1, so as to reduce a luminance difference between the second display region and the opening region and a luminance difference between the first display region and the second display region. The inventor of the present application finds that when values of $K_1$ and values of $K_2$ are set between 0.001 and 0.1, a luminance difference between the first display region, the second display region, and the opening region may not be observed by a human eye, thereby improving an overall black effect of the display apparatus in the black state.

Figure 1:
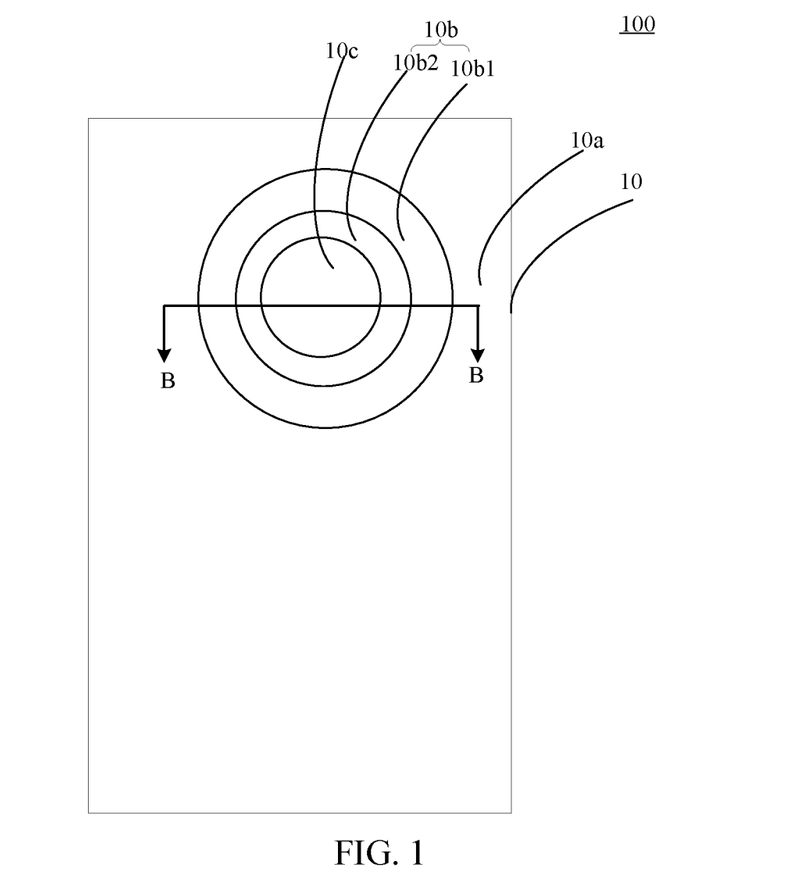
FIG. 1 is a schematic plan view of a display apparatus according to one or more embodiments of the present application.
Figure 2:
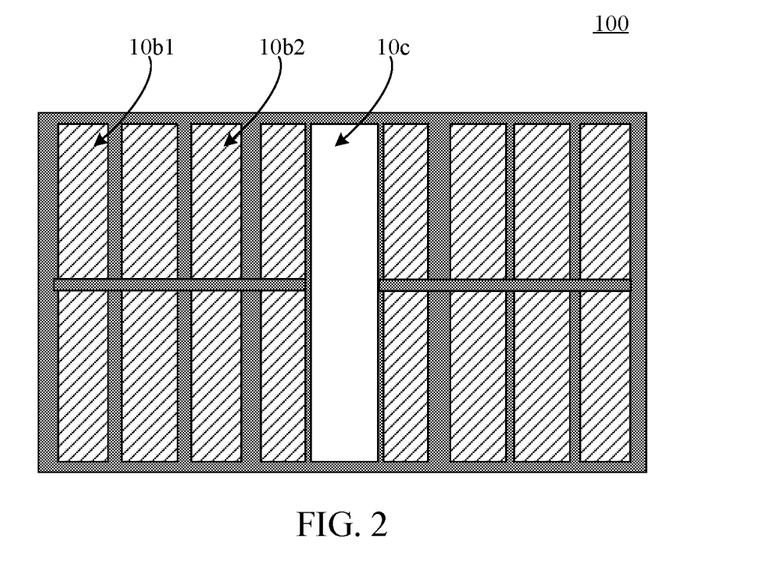
FIG. 2 is a top view of another display apparatus according to one or more embodiments of the present application.
Figure 3:
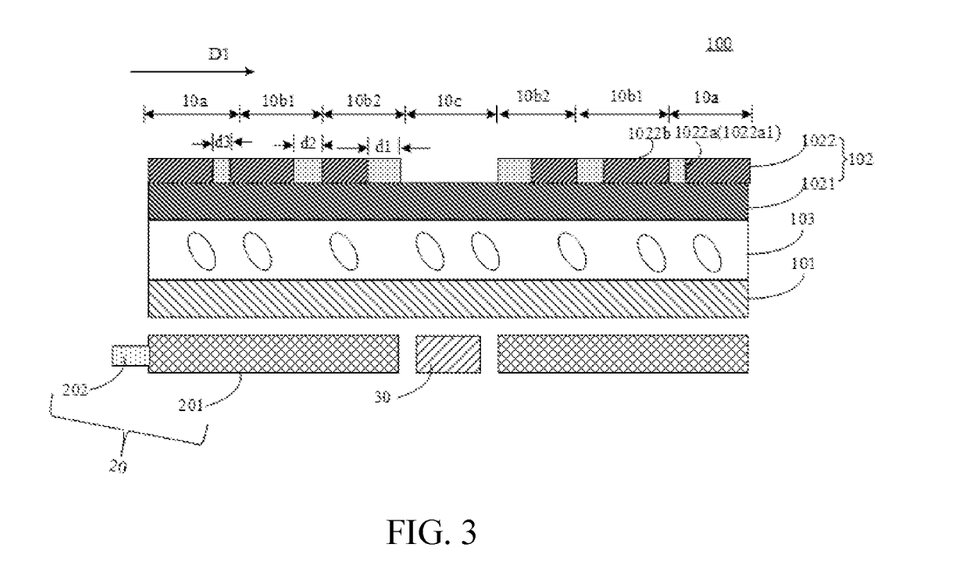
FIG. 3 is a schematic cross-sectional view of the display apparatus of a first structure, taken along a B-B line in FIG. 1, according to one or more embodiments of the present application.

The display apparatuses according to some embodiments of the present application will be described in detail below:

FIG. 1 is a schematic plan view of a display apparatus according to one or more embodiments of the present application. FIG. 2 is a top view of another display apparatus according to one or more embodiments of the present application. FIG. 3 is a schematic cross-sectional view of the display apparatus of a first structure, taken along a B-B line in FIG. 1, according to one or more embodiments of the present application.

One or more embodiments of the present application provide a display apparatus 100. The display apparatus 100 includes a display panel 10, a backlight module 20, and a sensor 30. The display panel 10 includes a first display region 10a, a second display region 10b, and an opening region 10c. The second display region 10b and the opening region 10c are adjacent, and the first display region 10a and the second display region 10b are adjacent. The backlight module 20 is disposed on a backlight side of the display panel 10, and the backlight module 20 corresponds to the first display region 10a and the second display region 10b. The sensor 30 corresponds to the opening region 10c.

It should be understood that the opening region 10c of the display apparatus 100 may be a regular graphics, for example, a rectangle or a circle, or may be an irregular graphics, for example, a water drop shape. For example, the opening region 10c shown in FIG. 1 is circular, and the opening region 10c shown in FIG. 2 is rectangular. It should be understood that a shape of the opening region is not limited in one or more embodiments of the present application.

In one or more embodiments of the present application, in the black state, luminance value of the first display region 10a, the second display region 10b, and the opening region 10c successively decreases. The first display region 10a has a first luminance value $I_1$, the second display region 10b and the opening region 10c have a first luminance difference value $DI_1$, a ratio of the first luminance difference value $DI_1$ to the first luminance value $I_1$ is $K_1$, and a value of $K_1$ ranges from 0.001 to 0.1. The first display region 10a and the second display region 10b have a second luminance difference value $DI_2$, a ratio of the second luminance difference value $DI_2$ to the first luminance value $I_1$ is $K_2$, and a value of $K_2$ ranges from 0.001 to 0.1. In the first display region 10a, the second display region 10b, and the opening region 10c in one or more embodiments of the present application, values ranges of $K_1$ and $K_2$ are set between 0.001 and 0.1, so as to reduce a luminance difference between the second display region and the opening region, and a luminance difference between the first display region and the second display region. The inventor of the present application finds that when values of K1 and K2 are set between 0.001 and 0.1, a luminance difference between a second display region and an opening region, and a luminance difference between a first display region and a second display region may not be observed by a human eye, thereby improving an overall black effect of the display apparatus in the black state.

In some embodiments, the second luminance difference value $DI_2$ is less than or equal to the first luminance difference value $DI_1$. In one or more embodiments of the present application, luminance difference values of two adjacent regions may or may not be equal. When luminance difference values of two adjacent regions are equal, luminance value of the first display region 10a, the second display region 10b, and the opening region 10c change in a gradient, so as to reduce a luminance difference between the display region and the opening region 10c. Therefore, luminance value of each region in the black state satisfies Weber's Law, $K=DI/I$. In Weber's Law; it is indicated that there is a difference value between a luminance value of an object and a luminance value of a background around it (for example, the luminance value that is just perceptible to the human eye). The luminance value of the perception of the human eye does not simply depend on an intensity of the light, but more on a contrast of the luminance value. K is a constant. The inventor of the present application finds that when a value of K is set between 0.001 and 0.1, a luminance difference between the second display region 10b and the opening region 10c is not observed by a human eye, thereby the overall black effect of the display apparatus 100 in the black state is improved.

It should be understood that the difference value between the two adjacent regions in one or more embodiments of the present application refers to a relative change value of luminance value in the two adjacent regions.

The black state refers to a state in which the display apparatus 100 displays only key information, such as time information, date information, power information or the like, on a screen.

The display apparatus 100 provided in one or more embodiments of the present application may be used as a vehicle instrument panel. With intelligent development of the vehicle, an image recognition technology is gradually applied to the vehicle, so as to implement functions such as in-vehicle payment, monitoring of a driver's physical condition, or an emotion. To further improve an aesthetics of an interior of the vehicle, more and more vehicle types in a market install a sensor 30 for image recognition at bottom of the screen of a vehicle instrument panel. It should be understood that, when the display apparatus 100 provided in one or more embodiments of the present application is used as the vehicle instrument panel, the display apparatus 100 in the black state displays only key information, such as speed information, rotation speed information, oil amount information or the like, on a screen.

The sensor 30 may be a camera, a biometric component, or the like.

The sensor 30 is disposed on a backlight side of the display panel 10, and the sensor 30 corresponds to the opening region 10c.

In one or more embodiments of the present application, luminance value of the first display region 10a, the second display region 10b, and the opening region 10c successively decreases, so that luminance value of the first display region 10a, the second display region 10b, and the opening region 10c changes in a gradient.

It should be noted that the backlight module 20 is not disposed in the opening region 10c. Theoretically, the luminance value of the opening region 10c in the black state is 0 nits. However, the display apparatus 100 in the related technology may not completely resolve a light leakage problem. Therefore, the opening region 10c in the black state still has weak light.

In some embodiments, the second display region 10b includes at least two sub-regions. The two sub-regions include a first sub-region 10b1 and a second sub-region 10b2. The second sub-region 10b2 surrounds the opening region 10c. The first sub-region 10b1 is disposed on a side of the second sub-region 10b2 away from the opening region 10c. When the display apparatus is in the black state, the first sub-region 10b1 and the second sub-region 10b2 respectively have a fourth luminance value and a fifth luminance value, and a ratio of $DI_3$ to $I_1$ ranges from 0.001 to 0.1, where $DI_3$ represents a third luminance difference between the fourth luminance value and the fifth luminance value. It should be understood that, in one or more embodiments of the present application, luminance value of the first display region 10a, the first sub-region 10b1, the second sub-region 10b2, and the opening region 10c changes in a gradient, thereby reducing a luminance difference between two adjacent regions, and improving the overall black effect of the display apparatus 100 in the black state.

In some embodiments, the third luminance difference value $DI_3$ is less than or equal to the first luminance difference value $DI_1$.

In some embodiments, the luminance difference between the opening region 10c and the second sub-region 10b2 is the first luminance difference value $DI_1$. The first sub-region 10b1 and the second sub-region 10b2 have the third luminance difference value $DI_3$. A luminance difference between the second sub-region and the first display region is the second luminance difference value $DI_2$. The first luminance difference value $DI_1$, the second luminance difference value $DI_2$, and the third luminance difference value $DI_3$ are equal. That is, the first luminance value of the first display region 10a is $I_1$, the luminance value of the first sub-region 10b1 is $I_1-DI_1$, the luminance value of the second sub-region 10b2 is $I_1-2DI_1$, and the luminance value of the opening region 10c is $I_1-3DI_1$. That is, in the black state, luminance value of the first display region 10a, the first sub-region 10b1, the second sub-region 10b2, and the opening region 10c changes in a gradient, thereby improving the overall black effect of the display apparatus 100.

In some embodiments, the aperture ratio of the first display region 10a is greater than the aperture ratio of the first sub-region 10b1, and the aperture ratio of the first sub-region 10b1 is greater than the aperture ratio of the second sub-region 10b2. In one or more embodiments of the present application, the pixel aperture ratio of the regions is adjusted, so as to adjust luminance values of the first sub-region 10b1 and the second sub-region 10b2. Therefore, a luminance difference between two adjacent regions is reduced, and an overall black effect of the display apparatus 100 in the black state is improved.

Specifically, the display panel 10 in the present application includes a color filter layer 1022. The color filter layer 1022 corresponds to the first display region 10a, the first sub-region 10b1, and the second sub-region 10b2. The color filter layer 1022 includes a black matrix 1022a and a plurality of color resists disposed in the black matrix 1022a. The black matrix 1022a includes a plurality of black blocks 1022a1 disposed at intervals. In a direction DI from the first display region 10a to the opening region 10c, a width d3 of the black block 1022a1 corresponding to the first display region 10a is less than a width d2 of the black block 1022a1 corresponding to the first sub-region 10b1. The width d2 of the black block 1022a1 corresponding to the first sub-region 10b1 is less than a width d1 of the black block 1022a1 corresponding to the second sub-region 10b2. In one or more embodiments of the present application, the width d2 of the black block 1022a1 corresponding to the first sub-region 10b1 and the width d1 of the black block 1022a1 corresponding to the second sub-region 10b2 are increased, so as to reduce the aperture ratios of the first sub-region 10b1 and the second sub-region 10b2. Therefore, the aperture ratios of the first display region 10a, the first sub-region 10b1, and the second sub-region 10b2 successively decrease, and the luminance difference between the adjacent regions decreases, thereby improving the overall black effect of the display apparatus 100 in the black state.

In some embodiments, in the direction DI from the first display region 10a to the opening region 10c, a ratio of the width d3 of the black block 1022a1 corresponding to the first display region 10a, the width d2 of the black block 1022a1 corresponding to the first sub-region 10b1, and the width d1 of the black block 1022a1 corresponding to the second sub-region 10b2 is 1:(1~2.5):(2.5~5). In a direction from the first display region 10a to the opening region 10c, a ratio of the width d3 of the black block 1022a1 corresponding to the first display region 10a, the width d2 of the black block 1022a1 corresponding to the first sub-region 10b1, and the width d1 of the black block 1022a1 corresponding to the second sub-region 10b2 may be any one of 1:1.5:3, 1:2:3, 1:2:4, 1:2.5:3.5, 1:2.5:4, or 1:2.5:5. The inventor of the present application finds that when the ratio of the width d3 of the black block 1022a1 corresponding to the first display region 10a, the width d3 of the black block 1022a1 corresponding to the first sub-region 10b1 and the width d1 of the black block 1022a1 corresponding to the second sub-region 10b2 in the direction from the first display region 10a to the opening region 10c is 1:(1~2.5):(2.5~5), the aperture ratios of the first display region 10a, the first sub-region 10b1, and the second sub-region 10b2 successively decrease, and the luminance difference between the adjacent regions decreases, thereby further improving the overall black effect of the display apparatus 100 in the black state.

In some embodiments, a first area of one of the color resists 1022b corresponding to the first display region 10a is greater than a second area of one of the color resists 1022b corresponding to the first sub-region 10b1, and the second area is greater than a third area of one of the color resists 1022b corresponding to the second sub-region 10b2. Specifically, a ratio of the first area, the second area, and the third area is 1:(0.5~1):(0~0.5). For example, the ratio of the area of the color resist 1022b corresponding to the first display region 10a, the area of the color resist 1022b corresponding to the first sub-region 10b1, and the area of the color resist 1022b corresponding to the second sub-region 10b2 may be any one of 1:0.6:0.4, 1:0.8:0.4, 1:0.9:0.4, 1:0.6:0.2, 1:0.6:0.3, or 1:0.7:0.4. The inventor of the present application finds that when the ratio of the area of the color resist 1022b corresponding to the first display region 10a, the area of the color resist 1022b corresponding to the first sub-region 10b1, and the area of the color resist 1022b corresponding to the second sub-region 10b2 is 1:(0.5~1):(0~0.5), the aperture ratios of the first display region 10a, the first sub-region 10b1, and the second sub-region 10b2 successively decrease. The luminance difference of the adjacent regions decreases, thereby further improves the overall black effect of the display apparatus 100 in the black state.

In some embodiments, colors of a plurality of color resists 1022b include blue, red, and green. In the first display region 10a, in one of the color resists corresponding to the first display region, an area of the green color resist, an area of the red color resist, and an area of the blue color resist have a first area ratio; in one of the color resists corresponding to the first sub-region, the area of the green color resist, the area of the red color resist, and the area of the blue color resist have a second area ratio; in one of the color resists corresponding to the second sub-region, the area of the green color resist, the area of the red color resist, and the area of the blue color resist have a third area ratio; and a ratio of the first area ratio, the second area ratio, and the third area ratio is (1:1:1):((0.9~0.8): 1:1):((0.8~0.7):(0.9~0.8): 1).

For example, a ratio of an area of the green color resist, an area of the red color resist, and an area of the blue color resist corresponding to the first display region 10a, the first sub-region 10b1, and the second sub-region 10b2 is (1:1:1):(0.9:1:1):(0.8:0.9:1).

For example, a ratio of an area of the green color resist, an area of the red color resist, and an area of the blue color resist corresponding to the first display region 10a, the first sub-region 10b1, and the second sub-region 10b2 is (1:1:1):(0.8:1:1):(0.8:0.9:1).

For example, a ratio of an area of the green color resist, an area of the red color resist, and an area of the blue color resist corresponding to the first display region 10a, the first sub-region 10b1, and the second sub-region 10b2 is (1:1:1):(0.9:1:1):(0.7:0.8:1).

For example, a ratio of an area of the green color resist, an area of the red color resist, and an area of the blue color resist corresponding to the first display region 10a, the first sub-region 10b1, and the second sub-region 10b2 is (1:1:1):(0.8:1:1):(0.7:0.8:1).

For example, a ratio of an area of the green color resist, an area of the red color resist, and an area of the blue color resist corresponding to the first display region 10a, the first sub-region 10b1, and the second sub-region 10b2 is (1:1:1):(0.8:1:1):(0.7:0.8:1).

It may be understood that, a ratio of an area of the red color resist, an area of the green color resist, and an area of the blue color resist in each of the first display region 10a, the first sub-region 10b1, and the second sub-region 10b2 is adjusted by using a reflectance difference between the red color resist, the green color resist, and the blue color resist. Therefore, luminance value of the first display region 10a, the first sub-region 10b1, and the second sub-region 10b2 is separately adjusted. Under a premise of ensuring the overall black effect, an overall transmittance of the display panel is reduced less. Transmittance of the display apparatus is improved. Light output efficiency is ensured, and a display effect is improved.

In some embodiments, the display panel further includes a plurality of data lines, the plurality of data lines are disposed at intervals. A width of the data line corresponding to the first sub-region 10b1 is greater than a width of the data line corresponding to the second sub-region 10b2, and a width of the data line corresponding to the second sub-region 10b2 is greater than a width of the data line corresponding to the first display region 10a. Therefore, an aperture ratio of the first display region 10a, an aperture ratio of the first sub-region 10b1, and an aperture ratio of the second sub-region 10b2 successively decrease. A luminance difference of an adjacent region decreases, thereby improving the overall black effect of the display apparatus 100 in the black state.

It should be understood that the display panel includes an array substrate 101, an opposite substrate 1021, and a liquid crystal layer 103 disposed between the array substrate 101 and the opposite substrate 1021. The color filter layer 1022 is disposed on the opposite substrate 1021, and constitutes the color filter substrate 102. In another embodiment, the color filter layer 1022 may also be disposed on the array substrate 101, to form a color filter on array (COA) substrate.

In some embodiments, the first luminance value $I_1$ is between 0.4 nits and 1 nits. For example, the first luminance value $I_1$ may be 0.4 nits, 0.5 nits, 0.6 nits, 0.7 nits, 0.8 nits, 0.9 nits, or 1 nits. A value range of the first luminance difference value $DI_1$ is 0.001 nits to 0.1 nits. For example, the first luminance difference value $DI_1$ may be 0.001 nits, 0.003 nits, 0.005 nits, 0.006 nits, 0.008 nits, 0.009 nits, or 0.1 nits. In the present application, a value range of the first luminance difference value $DI_1$ is set to 0.001 nits to 0.1 nits, that is, luminance values of the first display region 10a, the first sub-region 10b1, the second sub-region 10b2, and the opening region 10c successively decrease, so that a value of the Weber rate K is 0.001 to 0.1. The inventor of the present application finds that when the value of K is set to 0.001 to 0.1, a luminance difference between the first display region 10a, the second display region 10b, and the opening region 10c cannot be detected by a human eye, thereby improving the overall black effect of the display apparatus 100 in the black state.

Figure 4:
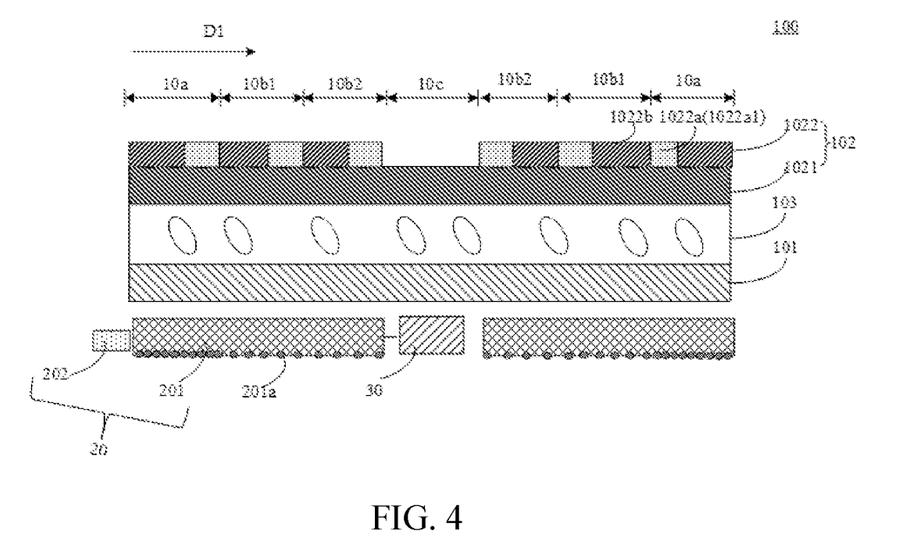
FIG. 4 is a schematic cross-sectional view of the display apparatus of a second structure, taken along the B-B line in FIG. 1, according to one or more embodiments of the present application.

Referring to FIG. 4, FIG. 4 is a schematic cross-sectional view of the display apparatus of a second structure, taken along the B-B line in FIG. 1, according to one or more embodiments of the present application. The display apparatus 100 as shown in FIG. 4 differs from the display apparatus 100 as shown in FIG. 2 in that the backlight module 20 includes a light guide plate 201 and a backlight 202 disposed on at least one side of the light guide plate 201. The light guide plate 201 has a plurality of dot structures 201a disposed on a backlight side that is away from the display panel. A density of the dot structure 201a corresponding to the first display region 10a is greater than a density of the dot structure 201a corresponding to the first sub-region 10b1. A density of the dot structure 201a corresponding to the first sub-region 10b1 is greater than a density of the dot structure 201a corresponding to the second sub-region 10b2. In one or more embodiments of the present application, the density of the dot structure 201a of the light guide plate 201 corresponding to each region of the display panel 10 is adjusted, so that the density of the dot structure 201a corresponding to the first display region 10a is greater than the density of the dot structure 201a corresponding to the first sub-region 10b1. The density of the dot structure 201a corresponding to the first sub-region 10b1 is greater than the density of the dot structure 201a corresponding to the second sub-region 10b2, so that the luminance value of the first display region 10a, the luminance value of the first sub-region 10b1, the luminance value of the second sub-region 10b2, and the luminance value of the opening region 10c successively decrease. The luminance difference between the first display region 10a, the luminance value of the first sub-region 10b1, the luminance value of the second sub-region 10b2, and the opening region 10c is reduced, so that the value of the Weber rate K is 0.001 to 0.1. The inventor of the present application finds that when the value of K is set to between 0.001 and 0.1, a human eye may not detect the luminance difference between the second display region 10b and the opening region 10c, thereby improving the overall black effect of the display apparatus 100 in the black state.

In some embodiments, a ratio of the density of the dot structure 201a corresponding to the first display region 10a, the density of the dot structure 201a corresponding to the first sub-region 10b1, and the density of the dot structure 201a corresponding to the second sub-region 10b2 is 1:(0.5~1):(0~0.5). For example, the ratio of the density of the dot structure 201a corresponding to the first display region 10a, the density of the dot structure 201a corresponding to the first sub-region 10b1, and the density of the dot structure 201a corresponding to the second sub-region 10b2 may be any one of 1:0.6:0.4, 1:0.8:0.4, 1:0.9:0.4, 1:0.6:0.2, 1:0.6:0.3, or 1:0.7:0.4. The inventor of the present application finds that when the ratio of the density of the dot structure 201a corresponding to the first display region 10a, the density of the dot structure 201a corresponding to the first sub-region 10b1, and the density of the dot structure 201a corresponding to the second sub-region 10b2 is 1:(0.5~1):(0~0.5), the luminance difference between the adjacent regions of the first display region 10a, the first sub-region 10b1, and the second sub-region 10b2 is reduced, thereby further improving the overall black effect of the display apparatus 100 in the black state.

It should be understood that, in one or more embodiments of the present application, the density of the dot structure 201a refers to a quantity of dot structures 201a in a unit region. If the density of the dot structure 201a is small, the quantity of dot structures 201a in a unit region is small. If the density of the dot structure 201a is large, the quantity of dot structures 201a in a unit region is large.

Figure 5:
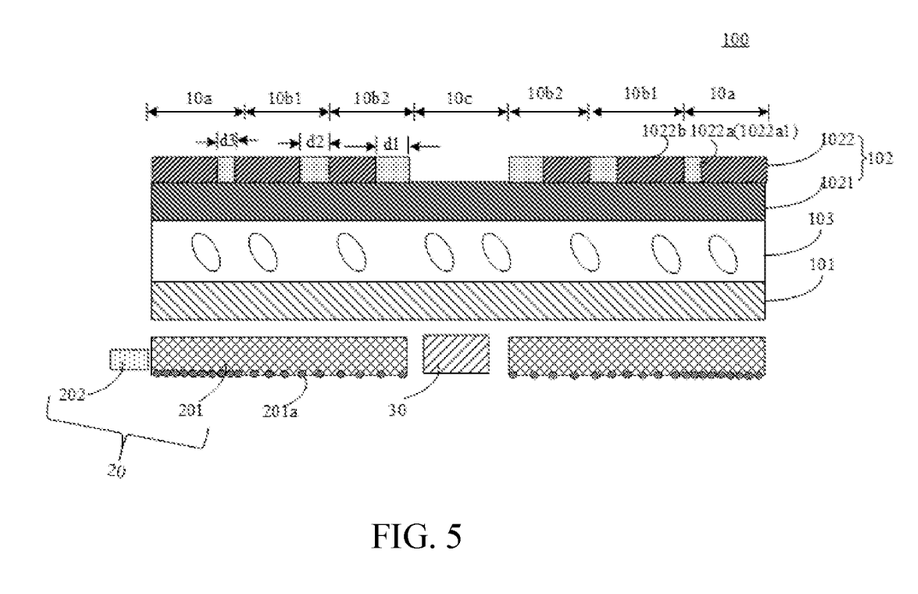
FIG. 5 is a schematic cross-sectional view of the display apparatus of a third structure, taken along the B-B line in FIG. 1, according to one or more embodiments of the present application.

Referring to FIG. 5, FIG. 5 is a schematic cross-sectional view of the display apparatus of a third structure, taken along the B-B line in FIG. 1, according to one or more embodiments of the present application. The display apparatus 100 as shown in FIG. 5 may be understood as a combination of the display apparatus 100 as shown in FIG. 2 and the display apparatus 100 as shown in FIG. 3.

Specifically, in the display apparatus 100 provided in one or more embodiments of the present application, along the direction DI from the first display region 10a to the opening region 10c, a width d3 of the black block 1022a1 corresponding to the first display region 10a is less than a width d2 of the black block 1022a1 corresponding to the first sub-region 10b1. The width d2 of the black block 1022a1 corresponding to the first sub-region 10b1 is less than a width d1 of the black block 1022a1 corresponding to the second sub-region 10b2.

A density of the dot structure 201a corresponding to the first display region 10a is greater than a density of the dot structure 201a corresponding to the first sub-region 10b1. The density of the dot structure 201a corresponding to the first sub-region 10b1 is greater than the density of the dot structure 201a corresponding to the second sub-region 10b2.

Certainly, in the second sub-region 10b2, the width of the black block 1022a1 may be set to be the same as the width of the black block 1022a1 corresponding to the first sub-region 10b1. However, the density of the dot structure 201a corresponding to the second sub-region 10b2 is adjusted to be less than the density of the dot structure 201a corresponding to the first sub-region 10b1.

By using the foregoing implementation, accuracy of enclosing the opening by the black matrix on the color filter substrate corresponding to the second sub-region 10b2 close to the opening region 10c may be reduced, and a process difficulty of the display panel may be reduced.

In one or more embodiments of the present application, the width of the black block 1022a1 and the density of the dot structure 201a of the light guide plate 201 of each region are simultaneously adjusted, so that a luminance difference between adjacent regions of the first display region 10a, the first sub-region 10b1, and the second sub-region 10b2 is reduced, thereby further improving the overall black effect of the display apparatus 100 in the black state.

Some embodiments of the present application have been described in detail above. The description of the above embodiments merely aims to help to understand the present application. Many modifications or equivalent substitutions with respect to the embodiments may occur to those of ordinary skill in the art based on the present application. Thus, these modifications or equivalent substitutions shall fall within the scope of the present application.

What is claimed is:

1. A display apparatus, comprising:
a display panel having a first display region, a second display region, and an opening region,
wherein the first display region is adjacent to the second display region, and the second display region is adjacent to the opening region; and
an aperture ratio of the first display region and an aperture ratio of the second display region are configured such that when the display apparatus is in a black state, the first display region, the second display region and the opening region respectively have a first luminance value $I_1$, a second luminance value and a third luminance value that decrease sequentially, a ratio of $DI_1$ to $I_1$ ranges from 0.001 to 0.1, and a ratio of $DI_2$ to $I_1$ ranges from 0.001 to 0.1, where $DI_1$ represents a first luminance difference between the second luminance value and the third luminance value, and $DI_2$ represents a second luminance difference between the first luminance value and the second luminance value.

2. The display apparatus according to claim 1, wherein $DI_2$ is less than or equal to $DI_1$.

3. The display apparatus according to claim 1, wherein the second display region comprises at least a first sub-region and a second sub-region, the second sub-region surrounds the opening region, and the first sub-region is disposed on a side of the second sub-region away from the opening region; and
an aperture ratio of the first sub-region and an aperture ratio of the second sub-region are configured such that when the display apparatus is in the black state, the first sub-region and the second sub-region respectively have a fourth luminance value and a fifth luminance value, and a ratio of $DI_3$ to $I_1$ ranges from 0.001 to 0.1, where $DI_3$ represents a third luminance difference between the fourth luminance value and the fifth luminance value.

4. The display apparatus according to claim 3, wherein $DI_3$ is less than or equal to $DI_1$.

5. The display apparatus according to claim 3, wherein a luminance difference between the fifth luminance value and the third luminance value is equal to $DI_1$,
a luminance difference between the first luminance value and the fourth luminance value is equal to $DI_2$, and $DI_1$, $DI_2$, and $DI_3$ are equal.

6. The display apparatus according to claim 3, wherein the aperture ratio of the first display region is greater than the aperture ratio of the first sub-region, and the aperture ratio of the first sub-region is greater than the aperture ratio of the second sub-region.

7. The display apparatus according to claim 6, wherein the display panel comprises a color filter layer corresponding to the first display region, the first sub-region, and the second sub-region;
the color filter layer comprises a black matrix and a plurality of color resists arranged in the black matrix, and the black matrix comprises a plurality of black blocks arranged at intervals; and
in a direction from the first display region to the opening region, a first width of one of the black blocks corresponding to the first display region is less than a second width of one of the black blocks corresponding to the first sub-region, and the second width is less than a third width of one of the black blocks corresponding to the second sub-region.

8. The display apparatus according to claim 7, wherein a ratio of the first width, the second width, and the third width is 1:(1~2.5):(2.5~5).

9. The display apparatus according to claim 7, wherein a first area of one of the color resists corresponding to the first display region is greater than a second area of one of the color resists corresponding to the first sub-region, and the second area is greater than a third area of one of the color resists corresponding to the second sub-region; and
a ratio of the first area, the second area, and the third area is 1:(0.5~1):(0~0.5).

10. The display apparatus according to claim 7, wherein the plurality of color resists comprises a green color resist, a red color resist, and a blue color resist;
in one of the color resists corresponding to the first display region, an area of the green color resist, an area of the red color resist, and an area of the blue color resist have a first area ratio;
in one of the color resists corresponding to the first sub-region, the area of the green color resist, the area of the red color resist, and the area of the blue color resist have a second area ratio;
in one of the color resists corresponding to the second sub-region, the area of the green color resist, the area of the red color resist, and the area of the blue color resist have a third area ratio; and
a ratio of the first area ratio, the second area ratio, and the third area ratio is (1:1:1):((0.9~0.8): 1:1):((0.8~0.7): (0.9~0.8): 1).

11. The display apparatus according to claim 1, wherein the second display region comprises a first sub-region and a second sub-region, the second sub-region surrounds the opening region, and the first sub-region is disposed on a side of the second sub-region away from the opening region;
the display apparatus further comprises a backlight module corresponding to the first display region and the second display region, the backlight module comprising a light guide plate and a backlight disposed on at least one side of the light guide plate, the light guide plate having a plurality of dot structures arranged on a backlight side away from the display panel; and
a first density of ones of the dot structures corresponding to the first display region is greater than a second density of ones of the dot structures corresponding to the first sub-region, and the second density is greater than a third density of ones of the dot structures corresponding to the second sub-region.

12. The display apparatus according to claim 11, wherein a ratio of the first density, the second density, and the third density is 1:(0.5~1):(0~0.5).

13. The display apparatus according to claim 1, wherein $I_1$ ranges from 0.4 nits to 1 nits, and $DI_1$ ranges from 0.001 nits to 0.1 nits.

14. The display apparatus according to claim 1, further comprising a sensor disposed on a backlight side of the display panel to correspond to the opening region.

15. A display apparatus, comprising:
a display panel having a first display region, a second display region, and an opening region, wherein the first display region is adjacent to the second display region, and the second display region is adjacent to the opening region;
a backlight module disposed on a backlight side of the display panel to correspond to the first display region and the second display region; and
a sensor corresponding to the opening region,
an aperture ratio of the first display region and an aperture ratio of the second display region are configured such that when the display apparatus is in a black state, the first display region, the second display region and the opening region respectively have a first luminance value $I_1$, a second luminance value and a third luminance value that decrease sequentially, a ratio of $DI_1$ to $I_1$ ranges from 0.001 to 0.1, and a ratio of $DI_2$ to $I_1$ ranges from 0.001 to 0.1, where $DI_1$ represents a first luminance difference between the second luminance value and the third luminance value, and $DI_2$ represents a second luminance difference between the first luminance value and the second luminance value.

16. The display apparatus according to claim 15, wherein $DI_2$ is less than or equal to $DI_1$.

17. The display apparatus according to claim 15, wherein the second display region comprises at least a first sub-region and a second sub-region, the second sub-region surrounds the opening region, and the first sub-region is disposed on a side of the second sub-region away from the opening region; and
an aperture ratio of the first sub-region and an aperture ratio of the second sub-region are configured such that when the display apparatus is in the black state, the first sub-region and the second sub-region respectively have a fourth luminance value and a fifth luminance value, and a ratio of $DI_3$ to $I_1$ ranges from 0.001 to 0.1, where $DI_3$ represents a third luminance difference between the fourth luminance value and the fifth luminance value.

18. The display apparatus according to claim 17, wherein $DI_3$ is less than or equal to $DI_1$.

19. The display apparatus according to claim 17, wherein a luminance difference between the fifth luminance value and the third luminance value is equal to $DI_1$,
a luminance difference between the first luminance value and the fourth luminance value is equal to $DI_2$, and
$DI_1$, $DI_2$, and $DI_3$ are equal.

20. The display apparatus according to claim 17, wherein the aperture ratio of the first display region is greater than the aperture ratio of the first sub-region, and the aperture ratio of the first sub-region is greater than the aperture ratio of the second sub-region.

* * * * *